(12) United States Patent
Zhao

(10) Patent No.: US 7,640,025 B2
(45) Date of Patent: *Dec. 29, 2009

(54) METHOD AND SYSTEM FOR DETERMINING THE ALTITUDE OF A MOBILE WIRELESS DEVICE

(75) Inventor: Wei Zhao, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/353,871

(22) Filed: Feb. 14, 2006

(65) Prior Publication Data
US 2006/0194588 A1    Aug. 31, 2006

(51) Int. Cl.
H04Q 7/20    (2006.01)
(52) U.S. Cl. ................... 455/456.1; 455/456.5
(58) Field of Classification Search ............ None
See application file for complete search history.

(56) References Cited

U.S. PATENT DOCUMENTS

2003/0222819 A1* 12/2003 Karr et al. ............ 342/457
2004/0002344 A1* 1/2004 Moeglein et al. ....... 455/456.1

OTHER PUBLICATIONS

Associated Press and Atlanta Journal Constitution, "Wireless Firms Lag on Location Technology," Apr. 14, 2001.
S. Khokhar, "Choose Wisely!: Which Location-Estimation Technologies Meet Market Needs?", 2001, www.geoplace.com/bg/2001/0401tt.asp.
F. Vitaliano, "TDMA vs. CDMA: How the Feds Blew It, Once Again," 1996, www.vxm.com/21R.62.html.
Federal Communications Commission Public Notice "Information Sought on Methods for Verifying Compliance with E911 Accuracy Standards," Oct. 8, www.fcc.gov/Bureaus/Engineering_Technology/Public_Notices/199/da99.
K. Bonsor, "How Location Tracking Will Work," 1998-2002, www.hotsuffworks.com/location-tracking.htm/printable.
N. Krasner, "Homing in on Wireless Location," 2002, www.commsdesign.com/main/1999/06/9906feat1.htm.

* cited by examiner

Primary Examiner—Lester Kincaid
Assistant Examiner—Phuoc Doan
(74) Attorney, Agent, or Firm—Woodcock Washburn LLP

(57) ABSTRACT

A method and system for determining the three-dimensional location of a mobile wireless device. In one implementation, the device is a cellular telephone making a 911 call from one floor of a multi-story building. An embodiment of the method of the invention includes establishing a database that associates transmission metrics with altitudes of x-y coordinate locations having more than one altitude at which the mobile wireless device could be located, receiving a communication from the mobile wireless device, determining an x-y coordinate location of the mobile wireless device, measuring a transmission metric of the mobile wireless device, and consulting the database to determine the altitude from the x-y coordinate location and the measured transmission metric. The transmission metric could be, for example, the transmission time or angle of arrival of a wireless signal received from the mobile wireless device.

19 Claims, 9 Drawing Sheets

| X-Y COORD. | ALTITUDE | METRIC | DESCRIPTION |
|---|---|---|---|
| X2,Y2 | Z2 | T2 | INTERSTATE 95 |
| | Z2' | T2' | ROUTE 1 |
| X3,Y3 | Z3 | T3 | 2ND FLOOR |
| | Z3' | T3' | 80TH FLOOR |
| X4,Y4 | Z4 | $\theta$ | 5TH FLOOR |
| | Z4' | $\theta'$ | 40TH FLOOR |

FIG. 7

METHOD AND SYSTEM FOR DETERMINING THE ALTITUDE OF A MOBILE WIRELESS DEVICE

BACKGROUND

1. Field of the Invention

The present invention relates generally to determining the location of a mobile wireless device, and more particularly, to determining the altitude of a wireless telephone caller with respect to a particular x-y coordinate location.

2. Background of the Invention

When a 911 emergency center receives a call, the ability to accurately locate the caller can dramatically affect the degree of success emergency personnel have in responding to the need for help. Dispatching the emergency personnel to the correct location is crucial to administering help as quickly as possible. When a person dials 911 from a traditional wireline telephone, the emergency center identifies the number of the wireline telephone and cross-references that number with an address database to determine the location of the wireline telephone, and thus the location of the caller.

Wireless telephones, however, are not fixed in a single location and therefore are not associated with any particular address. Thus, without a means for determining the location of the mobile wireless telephone, the emergency center must rely on the caller's knowledge and communication of her location, which often leads to errors. The inability to determine the location of a wireless caller is compounded by the fact that an increasing number of 911 calls are coming from wireless telephones. Indeed, studies indicate that approximately 45 million Americans made 911 calls from wireless telephones in the year 2000. In some areas, wireless 911 telephone calls account for fifty to seventy percent of the call volume coming into public centers.

Recognizing the need to automatically determine the location of wireless telephone callers, in 1996, the Federal Communications Commission required wireless network operators to have the ability to determine the location of wireless 911 callers by October 2001. As a result, wireless operators have developed what are generally referred to as enhanced 911, or E911, services. These services typically identify the latitude and longitude (i.e., x and y coordinates) of a wireless device that is making a 911 call.

E911 services help ensure that wireless telephones provide 911 call centers, or Public Safety Answering Points (PSAPs), with the vital information necessary to locate and identify a caller in an emergency. The E911 standards promulgated by the Federal Communications Commission (FCC) require wireless network providers to track the location and identity information of all wireless callers, with the purpose of providing such information to emergency personnel when a caller dials 911 from a wireless telephone.

Under the FCC rules, wireless networks and the corresponding wireless handheld devices, such as cellular telephones, will provide both the identity and location of the caller to a 911 dispatcher. To provide a caller's identity, the wireless handheld device will furnish a device identification, e.g., a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

When conventional E911 systems provide only a longitude and latitude for a wireless device, the systems assume that a device could be found at only one possible altitude of that location. Thus, for example, given x-y coordinates corresponding to a soccer field, emergency responders can assume that the wireless device is on the soccer field at the reported x-y coordinates. As another example, given x-y coordinates corresponding to a single-level highway, emergency responders can assume that the wireless device is on the highway at the reported x-y coordinates.

In many situations, however, buildings and irregular topography provide several different altitudes or elevations at which the wireless device could be located on the same x-y coordinates. For example, in a skyscraper, the same x-y coordinates could correspond to a device located on the first floor or the eightieth floor. An emergency responder arriving at the skyscraper, knowing only the x-y coordinates, would therefore be unable to quickly determine on which floor the emergency is occurring.

FIG. 1 illustrates this skyscraper problem, in which a coordinate X,Y within the footprint of building 100 is reported by the E911 location service. That particular coordinate X,Y could correspond to a device anywhere along the axis Z for the entire height H of building 100. Thus, the taller building 100 is, the more difficult it is to determine the exact location (i.e., altitude) of the calling wireless device.

As another example, on an interchange between major highways, several roads and ramps may pass under and over each other. The same x-y coordinates could correspond to a device located, for example, on the lowest road or a bridge passing high above. Knowing only the x-y coordinates, an emergency responder would have to guess on which road the emergency is occurring.

FIG. 2 illustrates this situation, in which a first road 200 passes underneath a second road 202. A particular coordinate X1,Y1 is reported by the E911 location service. However, as shown, that particular coordinate X1,Y1 could correspond to a point on road 200 at a first altitude A1 or to a point on road 202 above at a second altitude A2. Thus, knowing only the coordinate X1,Y1, an emergency dispatcher does not know whether to send responders to road 200 or road 202.

SUMMARY OF THE INVENTION

The present invention provides a method and system for determining the three-dimensional location of a mobile wireless device. Given an x-y coordinate location of a mobile wireless device, the present invention determines the altitude at which the mobile wireless device is located. In this manner, the present invention provides a more accurate location determination in situations in which a mobile wireless device could be found at different altitudes on the same x-y coordinates. This enhanced location method can therefore significantly improve the ability of emergency personnel to quickly locate and reach wireless telephone callers in need of help.

An embodiment of the present invention provides a method for determining the altitude of a mobile wireless device that includes establishing a database that associates transmission metrics with altitudes of x-y coordinate locations having more than one altitude at which the mobile wireless device could be located, receiving a communication from the mobile wireless device, determining an x-y coordinate location of the mobile wireless device, measuring a transmission metric of the mobile wireless device, and consulting the database to determine the altitude from the x-y coordinate location and the measured transmission metric. The x-y coordinate location can be determined by, for example, a global positioning system, signal attenuation, angle of arrival (AOA), time of arrival (TOA), time difference of arrival (TDOA), enhanced observed time of arrival (E-OTD), time advance (TA), or a combination of any of the foregoing. The transmission metric could be, for example, the time a wireless signal takes to travel from the mobile wireless device to a fixed wireless signal receiver and/or the angle of arrival of a wireless signal from the mobile wireless device. Optionally, the transmission metric is measured from more than one wireless signal receiver.

Another embodiment of the present invention provides a system for determining the altitude of a mobile wireless device that includes a wireless signal receiver, a location system, a database, and a processor. The wireless signal receiver is in communication with the mobile wireless device. The location system is adapted to determine an x-y coordinate location of the mobile wireless device. The database contains x-y coordinates at which the mobile wireless device could be located at more than one altitude. The database also associates possible altitudes with each x-y coordinate location and associates a value of a transmission metric with each possible altitude. The transmission metric relates to a wireless signal received by the wireless signal receiver from the mobile wireless device. The processor is adapted to receive a current x-y coordinate location of the mobile wireless device from the location system, to measure a current value of the transmission metric, and to retrieve an altitude associated with the current x-y coordinate location and the current value from the database.

BRIEF DESCRIPTION OF THE DRAWINGS

FIG. 7 is a table illustrating associations between x-y coordinates, altitudes, transmission metrics, and descriptions, according to an embodiment of the present invention.

DETAILED DESCRIPTION OF THE INVENTION

The present invention provides the three-dimensional location of a mobile wireless device. Given a particular x-y coordinate location from which a mobile wireless device is transmitting, the present invention provides the altitude of the device. Optionally, the present invention also provides a description that correlates the altitude with the physical structure or topography of the x-y coordinate location.

Figure 1:
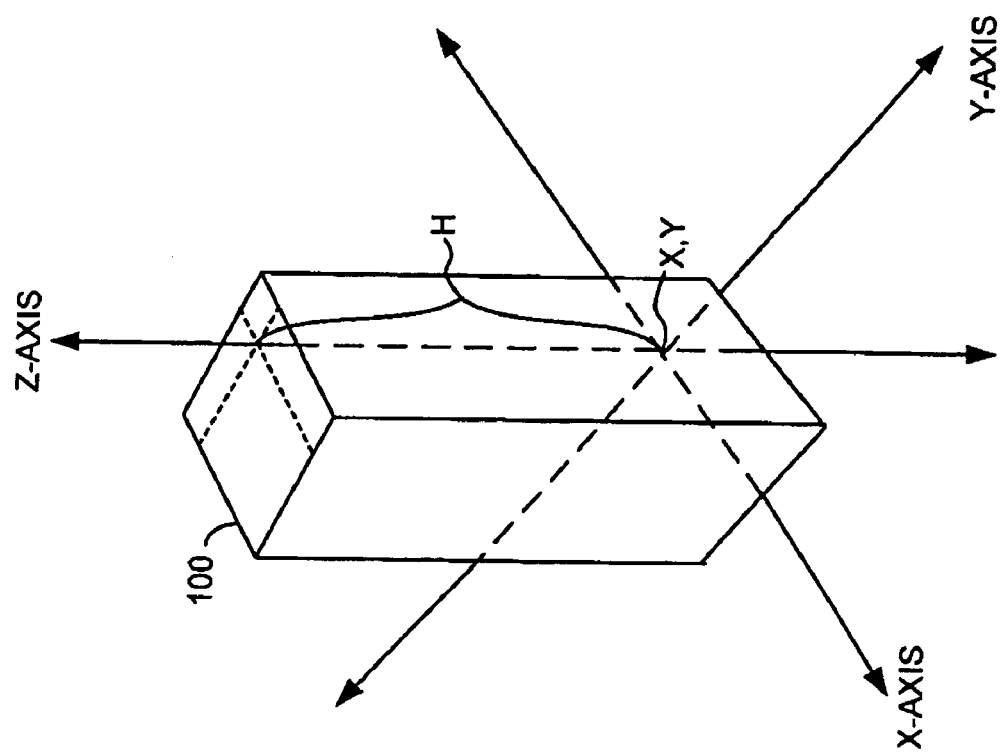
FIG. 1 is a schematic diagram illustrating the various altitudes at which a wireless device could be located inside a building for a particular x-y coordinate location.
Figure 2:
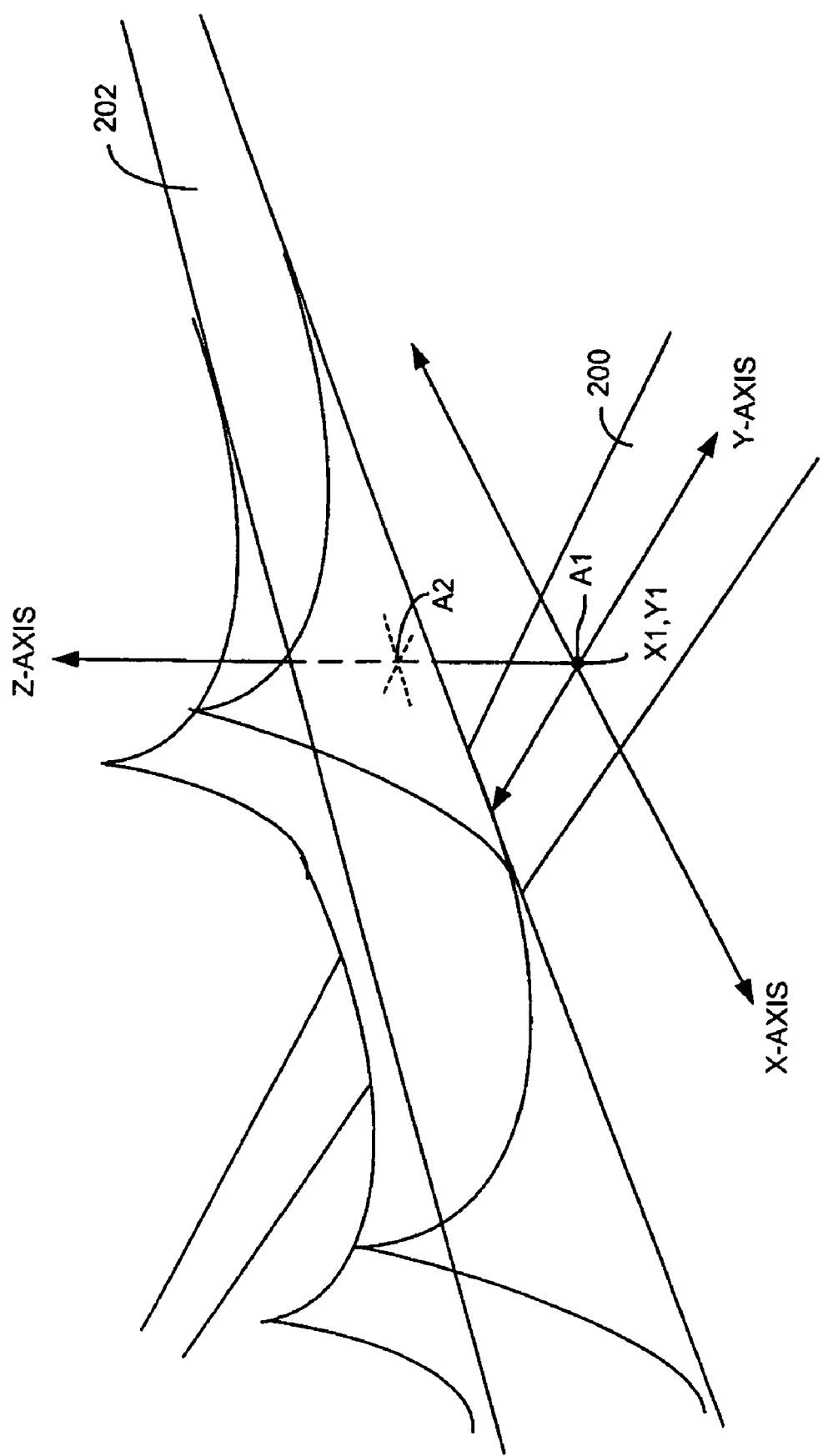
FIG. 2 is a schematic diagram illustrating two different altitudes at which a wireless device could be located at a highway interchange for a particular x-y coordinate location.
Figure 3:
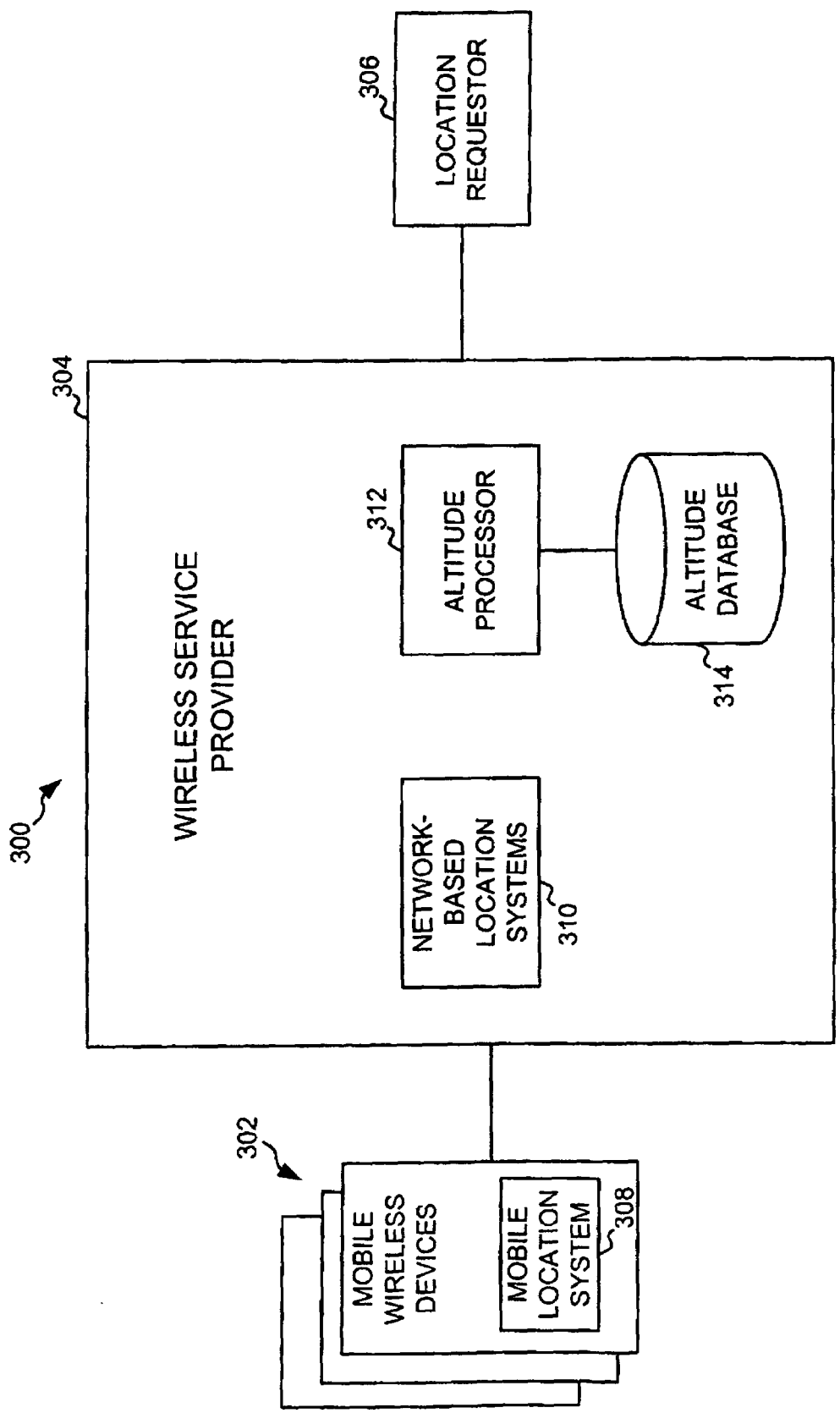
FIG. 3 is a schematic diagram illustrating an exemplary system for determining the altitude of a wireless device, according to an embodiment of the present invention.

FIG. 3 illustrates an exemplary system 300 for determining the three-dimensional location of a wireless device, according to an embodiment of the present invention. As shown, system 300 includes a plurality of mobile wireless devices 302, a wireless service provider 304, and a location requestor 306.

Mobile wireless devices 302 include any communication device supported by wireless service provider 304. Common examples of wireless devices include cellular telephones, cellular telephones with text messaging capabilities, wireless personal digital assistants (PDAs), and interactive text pagers. A mobile wireless device 302 can include a mobile location system 308, which determines the x-y coordinates of the device 302. As an example, mobile location system 308 could be a global positioning system.

Wireless service provider 304 provides the communications network that supports the plurality of mobile wireless devices 302. In this embodiment, wireless service provider 304 also includes one or more network-based location systems 310 and an altitude processor 312. Network-based location systems 310 provide the x-y coordinates of mobile wireless devices 302, and can use technologies such as signal attenuation, angle of arrival, time of arrival, time difference of arrival, enhanced observed time of arrival, time advance, and global positioning systems (e.g., GPS systems in which network components receive raw GPS data from mobile devices and calculate exact locations from the data). Altitude processor 312 determines the altitude or elevation of a mobile wireless device 302, given the x-y coordinates of the device. This determination is based on the time it takes for a wireless signal to travel from the wireless device 302 to a wireless signal receiver of wireless service provider 302 and/or on the angle at which the signal arrives at the wireless signal receiver. Knowing the time or angle, altitude processor 312 consults an altitude database 314 to retrieve an associated altitude and, optionally, a description of the altitude.

Although FIG. 3 shows network-based location systems 310 and altitude processor 312 as part of wireless service provider 304, one of ordinary skill in the art would appreciate that these components could be separate from wireless service provider 304, for example, as a part of a location service provider.

Location requestor 306 is the entity that is requesting the three-dimensional location of a wireless device. For example, in an emergency, location requestor 306 would be a 911 emergency call center, also known as a Public Safety Answering Point (PSAP). As another example, location requestor 306 could be a retail store that occupies several floors of a building and desires the ability to track the location of customers among the several floors.

When a mobile wireless device 302 is in operation, wireless service provider 304 tracks the location and identity of the device. Each of the plurality of mobile wireless devices 302 provides wireless service provider 304 with its identities, typically as a mobile identification number (MIN). For tracking location and providing x-y coordinates, system 300 could have individual location systems 308 in mobile wireless devices 302, could have a network-based location system 310 as part of wireless service provider 304, or could use a combination of both systems 308 and 310. As an example, a typical network-based location system would be a system that calculates triangulation across cell sites or cell sectors. A typical example of a suitable individual location system would be a global positioning system.

Figure 4:
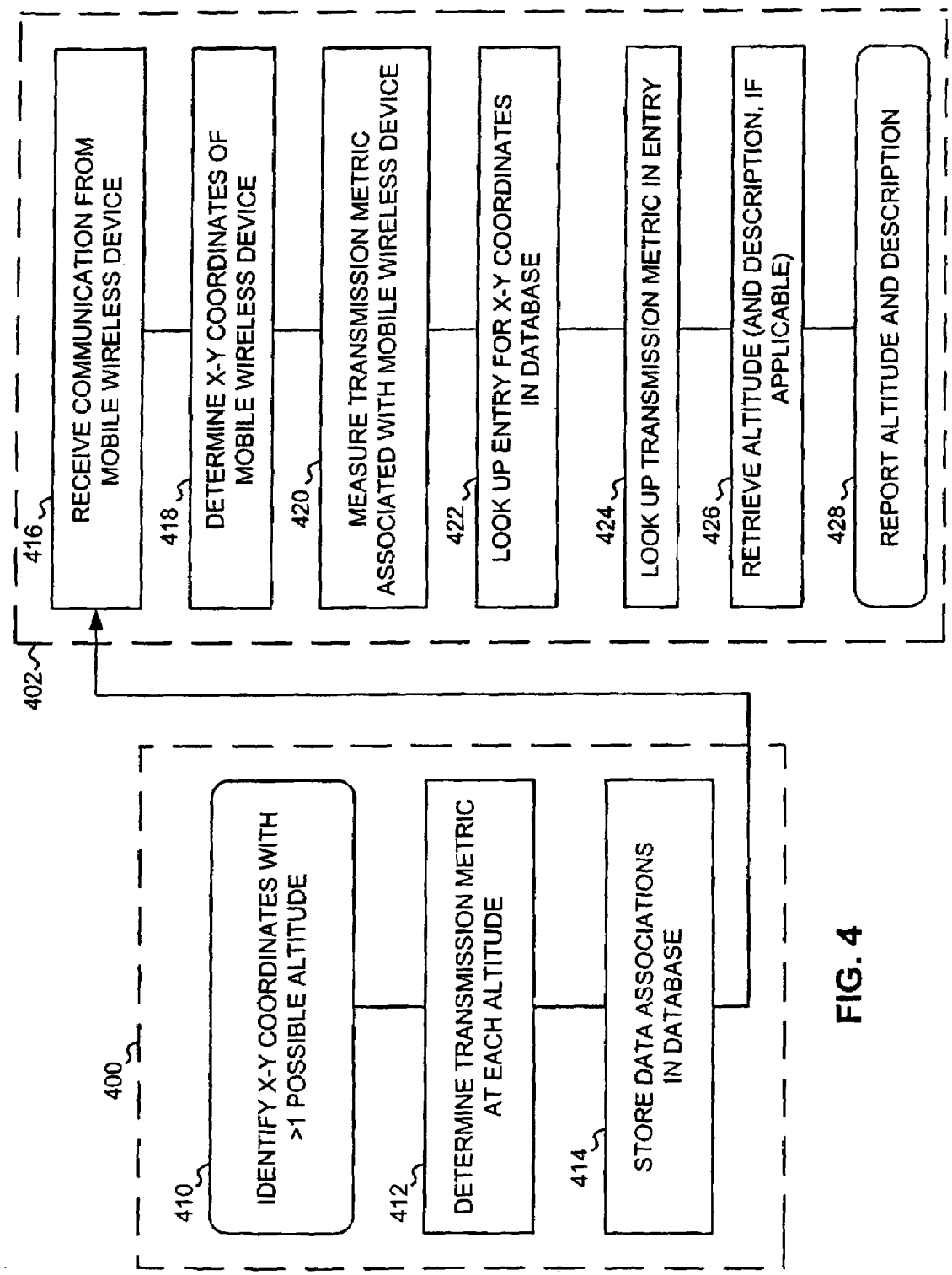
FIG. 4 is a flowchart outlining an exemplary method for determining the altitude of a mobile wireless device, according to an embodiment of the present invention.

With continuing reference to FIG. 3, FIG. 4 illustrates an exemplary method for determining the altitude of a mobile wireless device, according to an embodiment of the present invention. This exemplary method encompasses two phases: an altitude database creation phase 400 and an altitude determination phase 402. In the altitude database creation phase 400, transmission metric data is collected for x-y coordinate locations having more than one possible altitude and is stored in a database that correlates the transmission metric data to the different altitudes of the x-y coordinate locations. As an example, this phase could involve a technician visiting a multi-story building, collecting transmission metric data for each level of the building, and entering the data in a database. In the altitude determination phase 402, a wireless service provider receives the x-y coordinate location of a communicating mobile wireless device, measures a transmission metric of the communicating mobile wireless device, and consults the database to determine the altitude of the device.

As shown in FIG. 4, the method begins at step 410 of altitude database creation phase 400 with the identification of x-y coordinates that have more than one possible altitude at which a wireless device could be located. Such x-y coordinates could correspond to, for example, multi-story buildings, highway interchanges, stadiums, and multi-level parking garages.

Having identified x-y coordinates with multiple possible altitudes, the method continues in step 412 by determining a wireless signal transmission metric associated with each possible altitude (i.e., each possible z coordinate). In one embodiment, this transmission metric is the time that a wireless signal takes to travel from the mobile wireless device 302 at the x-y-z location to the wireless signal receiver of the network of wireless service provider 304. In another embodiment, this transmission metric is the angle of arrival of the wireless signal at the wireless signal receiver.

Figure 5:
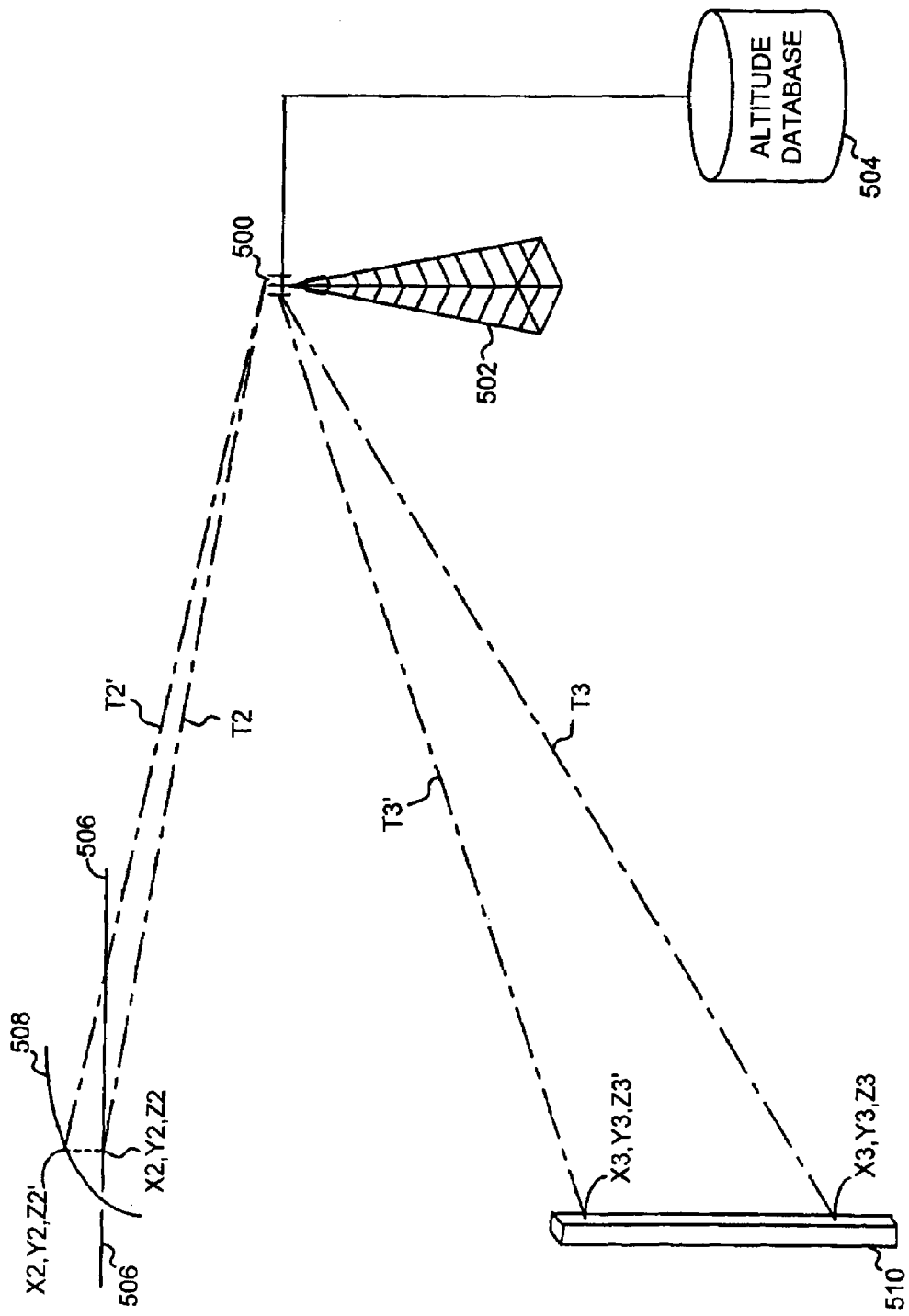
FIG. 5 is a schematic diagram illustrating the measurement of transmission time for different possible altitudes, according to an embodiment of the present invention.

FIG. 5 illustrates the measurement of transmission time for different possible altitudes. As shown, this example includes a wireless signal receiver 500 on a cellular tower 502. Wireless signal receiver 500 is in communication with an altitude database 504, which corresponds to database 314 of FIG. 3. Altitude database 504 could reside in a mobile switching center of the network of wireless service provider 304.

FIG. 5 illustrates two examples of x-y coordinates from which a mobile wireless device could transmit from different altitudes. In the first example, the intersection of highways 506 and 508 at coordinates X2,Y2 shows two altitudes Z2 and Z2' at which a mobile wireless device could be located. Altitude Z2 corresponds to highway 506, while altitude Z2' corresponds to highway 503. Because the distance between wireless signal receiver 500 and altitude Z2 differs from the distance between wireless signal receiver 500 and Z2', the measured transmission times also differ, as represented by time T2 and T2'. In other words, a wireless signal from a mobile wireless device 302 located on highway 506 at coordinates X2,Y2,Z2 takes time T2 to travel to wireless signal receiver 500. A mobile wireless device 302 located on highway 508 at coordinates X2,Y2,Z2' takes time T2' to travel to wireless signal receiver 500.

In the second example, a multi-story building 510 is located at coordinates X3,Y3, which includes several floors on which a mobile wireless device could be located. Altitude Z3 corresponds to the second floor, while altitude Z3' corresponds to the eightieth floor. Again, because the distance between wireless signal receiver 500 and altitude Z3 differs from the distance between wireless signal receiver 500 and altitude Z3', the measured transmission times also differ, as represented by time T3 and T3'. Thus, a wireless signal from a mobile wireless device 302 located on the second floor of building 510 at coordinates X2,Y2,Z3 takes time T3 to travel to wireless signal receiver 500. A wireless signal from a mobile wireless device 302 located on the eightieth floor of building 510 at coordinates X2,Y2,Z3' takes time T3' to travel to wireless signal receiver 500.

To measure transmission time, a preferred embodiment of the present invention uses the time-division multiple access (TDMA) digital cellular system. This system tracks the time that wireless signals take in traveling from handsets to mobile stations. As another option, the TDMA-based Global System for Mobile Communications (GSM) digital cellular system could be used, which also tracks transmission times between handsets and mobile stations.

Figure 6:
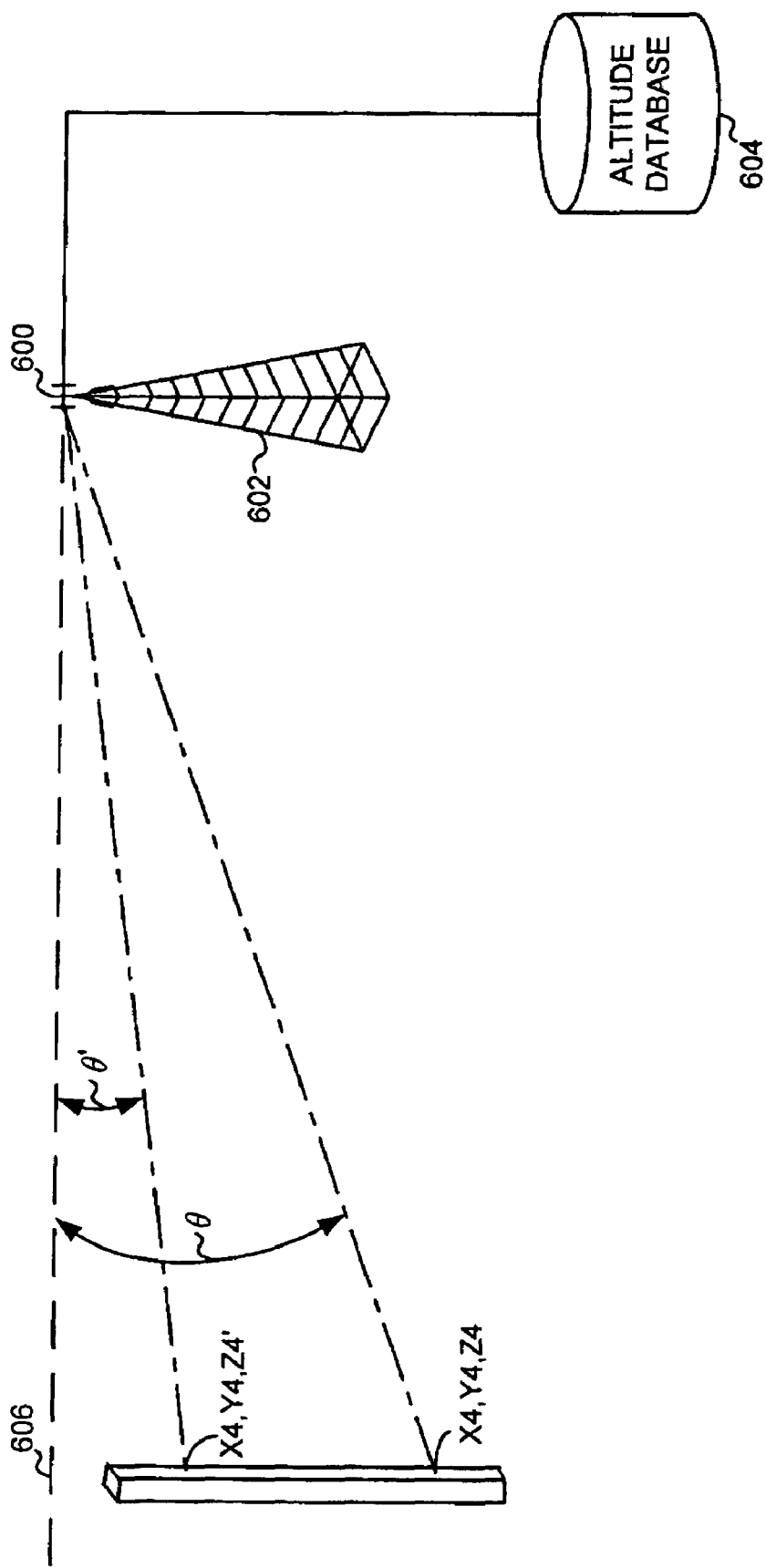
FIG. 6 is a schematic diagram illustrating the measurement of transmission angle of arrival for two possible altitudes of a mobile wireless device at a building, according to an embodiment of the present invention.

As another example of a transmission metric, FIG. 6 illustrates the measurement of transmission angle of arrival for two different possible altitudes Z4 and Z4' at a building 600 located at coordinates X4,Y4. Altitude Z4 corresponds to the fifth floor of building 600, while altitude Z4' corresponds to the fortieth floor. As shown, this example includes a wireless signal receiver 600 on a cellular tower 602. To measure signal angles, wireless signal receiver 600 includes a directional antenna, such as a phased array of two or more antenna elements. Wireless signal receiver 600 is in communication with an altitude database 604, which corresponds to database 314 of FIG. 3. Altitude database 604 could reside in a mobile switching center of the network of wireless service provider 304.

As shown in FIG. 6, the measured angle of arrival differs for each altitude Z4 and Z4'. Thus, wireless signal receiver 600 receives a signal from a mobile wireless device 302 located at X4,Y4,Z4 at an angle θ, and receives a signal from a mobile wireless device 302 located at X4,Y4,Z4' at an angle θ'. In this example, the angle of arrival is measured with respect to a horizontal axis 606.

As with transmission times, the TDMA and GSM digital cellular systems can also be used to measure angle of arrival. Indeed, using TDMA and GSM systems to determine both transmission times and also angles of arrival enables more accurate altitude determinations, as described in more detail below in reference to FIG. 8.

Returning to FIG. 4, with the transmission metric measured, the method continues in step 414 by storing the altitudes and metrics associated with each x-y coordinate location. These associations are stored in altitude database 314. Specifically, each x-y coordinate location is associated with all of its possible altitudes, and with a transmission metric for each of the possible altitudes. Thus, for the highway example of FIG. 5, coordinate X2,Y2 would be associated with altitudes Z2 and Z2'. In turn, altitude Z2 would be associated with T2 and altitude Z2' would be associated with T2'.

Optionally, altitude database 314 could also include a description of the altitude that would help a person understand the location. For example, the description "Interstate 95" could be associated with altitude Z2 to describe highway 506.

FIG. 7 illustrates an example table 700 of the associations stored in altitude database 314. In column 702, the x-y coordinate entries (X2,Y2), (X3,Y3), and (X4,Y4) correspond to the examples shown in FIGS. 5 and 6. Column 704 lists the possible altitudes at which a mobile wireless device 302 could be found at each of these locations. Column 706 lists the transmission metric associated with each altitude, such as a time of transmission of a wireless signal or an angle of arrival of a wireless signal. Finally, column 708 lists a common name or description that gives an ordinary meaning to the altitude.

For example, altitude Z3 at coordinates X3,Y3 is described as the second floor of the building.

With altitude database 314 populated, the altitude database creation phase 400 is complete, as shown in FIG. 4. The exemplary method continues in the altitude determination phase 402. In this phase, wireless signal provider 304 receives a communication from a mobile wireless device 302 and determines the three-dimensional location of the mobile wireless device 302 based on the altitude data collected in phase 400.

The altitude determination phase 402 begins in step 416 when a communication is received from a mobile wireless device 302 for which three-dimensional location information is desired. In this example, location requestor 306 is the entity that desires the location information. As an example, the communication could be a 911 call from a wireless telephone (mobile wireless device 302), and location requestor 306 could be a Public Safety Answering Point.

Once the communication is in progress, the method continues by determining the x-y coordinates of the mobile wireless device 302. This location determination is accomplished by mobile location system 308, network-based location systems 310, or some combination thereof. The location determination can also include the retrieval of a description associated with the x-y coordinates, such as a building name, street address, or highway interchange number. Thus, at the end of step 418, wireless service provider 304 knows the x-y coordinate location of the mobile wireless device 302, along with a description of the x-y coordinate location, if applicable.

Given the x-y coordinates, in step 420, altitude processor 312 of wireless service provider 304 measures a transmission metric associated with the mobile wireless device 302. In a first embodiment, this transmission metric is the time that a wireless signal takes to travel from mobile wireless device 302 to a wireless signal receiver of wireless service provider 304. Taking the skyscraper example of FIG. 5, the time for a wireless signal to travel from a mobile wireless device 302 located on the eightieth floor of building 510 to wireless signal receiver 500 would be measured as T3'.

In a second embodiment, the transmission metric is the angle of arrival of a wireless signal from the mobile wireless device 302. Considering the example of FIG. 6, the angle at which a wireless signal is received from a mobile wireless device 302 on the fortieth floor of building 600 would be measured as θ'.

Thus, at the end of step 420, wireless service provider 304 has the x-y coordinates of the mobile wireless device 302, as well as a measured transmission metric associated with the mobile wireless device 302. In step 422, altitude processor 312 looks up the given x-y coordinates in altitude database 314. In the exemplary table 700 of FIG. 7, altitude processor 312 would search the x-y coordinate column 702.

After locating the appropriate x-y coordinate entry in altitude database 314, in step 424, altitude processor 312 looks in the entry for the transmission metric that was measured in step 420 (or a value that is substantial equivalent to the measured transmission metric, e.g., within some acceptable range of measuring error). After locating the metric, in step 426, altitude processor 312 retrieves the altitude associated with the metric. Thus, for example, referring to FIG. 7, given coordinate X2,Y2 and metric T2', altitude processor 312 would retrieve the altitude Z2'.

Optionally, in step 426, if a description has been associated with the retrieved altitude in altitude database 314, then altitude processor 312 retrieves that description as well. Continuing the previous example, altitude processor 312 would retrieve the description "Route 1," which is associated with altitude Z2'. This description correlates the altitude to the actual physical structure or topography located at the given x-y coordinates. For example, a person trying to find a mobile wireless device that is located in a building would understand the description "$10^{th}$ floor" better than the altitude of one hundred feet.

As the final step of altitude determination phase 402, wireless service provider 304 reports the three-dimensional location of the mobile wireless device 302 to location requestor 306 in step 428. This three-dimensional location includes the x-y coordinates, the altitude, and descriptions of the x-y coordinates and altitude, if applicable.

As one of ordinary skill in the art would appreciate, implementations of the present invention must take into consideration the resolution capabilities of the systems and equipment used to determine the x-y coordinate location and the transmission metric of the mobile wireless device. Ideally, location systems 308 and 310 would be able to determine x-y coordinates with an error of less than one foot in either the x or y direction. This level of accuracy would ensure that a measured difference in transmission metric (e.g., time) is attributable to a change in altitude, rather than an error in the x-y coordinates (i.e., an error range in the x-y plane). For example, if, because of the limited accuracy of the location systems 308 and 310, the mobile wireless device could be found anywhere within a 4000 square foot area of the reported x-y coordinates, then the measured transmission metric (e.g., time or angle of arrival) could vary over the 4000 square foot area even though the altitude is the same. The difference in the measured transmission metric could therefore be mistaken for a different altitude. Thus, location systems 308 and 310 preferably have accuracies that minimize this effect.

Similarly, one of ordinary skill in the art would also appreciate that the equipment used to measure the transmission metric should be sensitive enough to measure differences between mobile wireless devices transmitting at different altitudes. For example, measuring equipment located at a base station one mile away from the x-y coordinates should be sensitive enough to distinguish between the differences in transmission time or angle between two different altitudes. In this way, for example, the equipment would be able to measure the time of transmission from one floor of a building as different duration (e.g., one nanosecond longer) than the transmission time from the next floor up. Of course, the desired accuracy of the altitude determination is also a factor. If a user merely needs to know whether a mobile wireless device is located in the bottom half or top half of a tall building, then a greater error factor in the measured transmission metric could be tolerated.

To compensate for limited accuracy of x-y coordinate determinations and to resolve ambiguities in measured transmission metrics, an embodiment of the present invention determines altitude using more than one transmission metric. For example, both transmission time and angle of arrival could be measured and cross-referenced to an altitude in an x-y coordinate entry of the altitude database.

Figure 8:
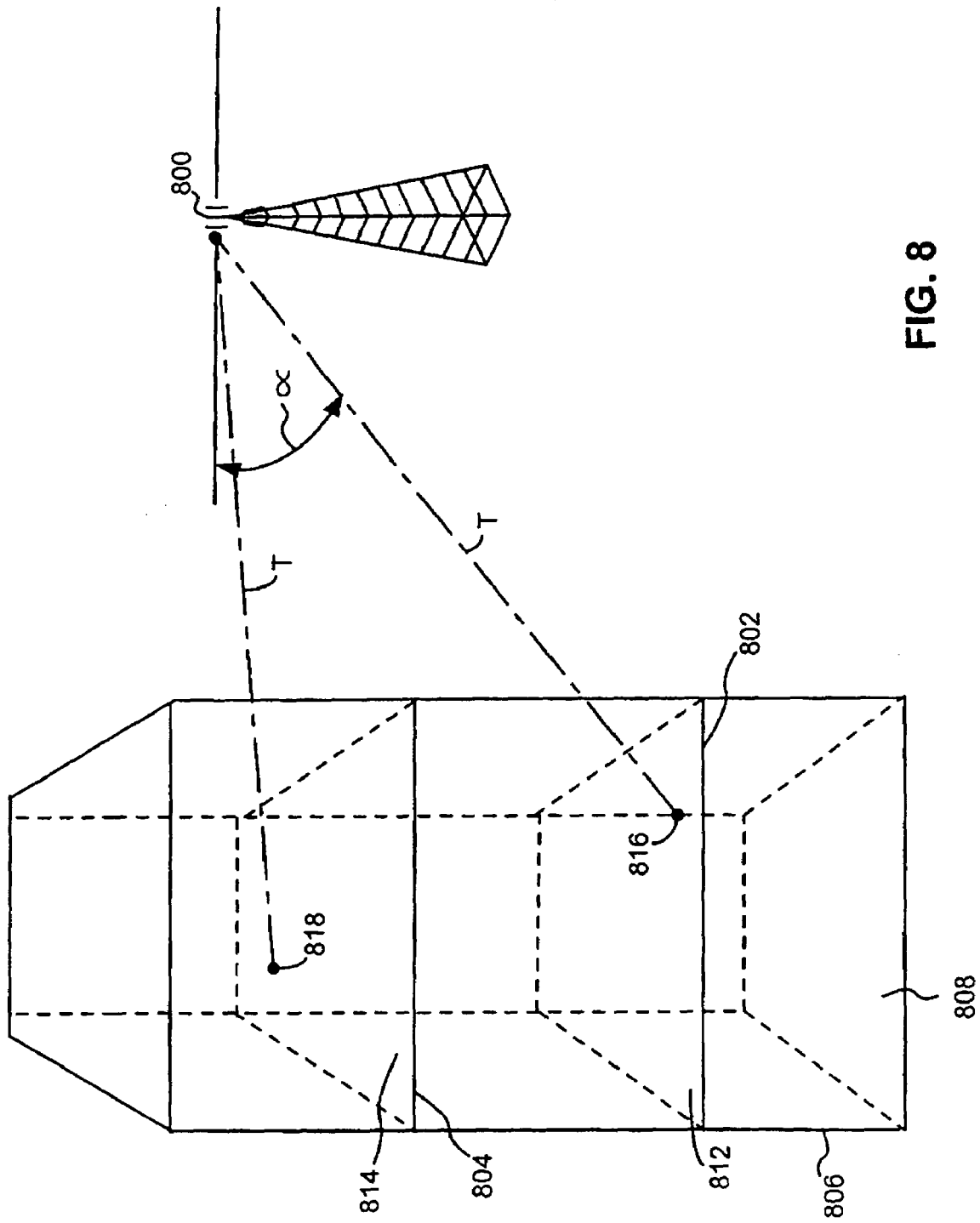
FIG. 8 is a schematic diagram illustrating a method for determining altitude using more than one transmission metric, according to an embodiment of the present invention.

FIG. 8 illustrates this method of error correction. As shown, a wireless signal receiver 800 is measuring transmission metrics for a first floor 802 and a second floor 804 of a building 806. Area 808 represents the error range of the x-y coordinate location system. In other words, when the location system reports x-y coordinates corresponding to building 806, a mobile wireless device could be located anywhere within area 808 (which is, for example, a 4000 square foot area). Likewise, the location system would report the x-y coordinates responding to building 806 for a mobile wireless device transmitting from floor 802 or 804 anywhere within the areas 812 and 814, respectively.

Therefore, as shown in FIG. 8, if time of transmission is used as the transmission metric, then it is possible to measure the same time for mobile wireless devices that are on different floors (i.e., at different altitudes). For example, relative to wireless signal receiver 800, a point 816 on near side of floor 802 might be the same distance away as a point 818 on the far side of floor 804. Therefore, the time of transmission T would be the same at these two different altitudes (i.e., floors). However, measuring the angle of arrival in addition to the transmission time solves this problem. For example, if the angle of arrival is determined to be angle $\alpha$, then it could be determined that the mobile wireless device is located on floor 802 at point 816, and not on floor 804 at point 818.

As another way to compensate for limited x-y coordinate accuracy and to resolve ambiguities in measured transmission metrics, another embodiment of the present invention determines altitude using more than one wireless signal receiver. In other words, a first transmission metric is measured between the mobile wireless device and a first wireless signal receiver, and a second transmission metric is measured between the mobile wireless device and a second wireless signal receiver.

Figure 9:
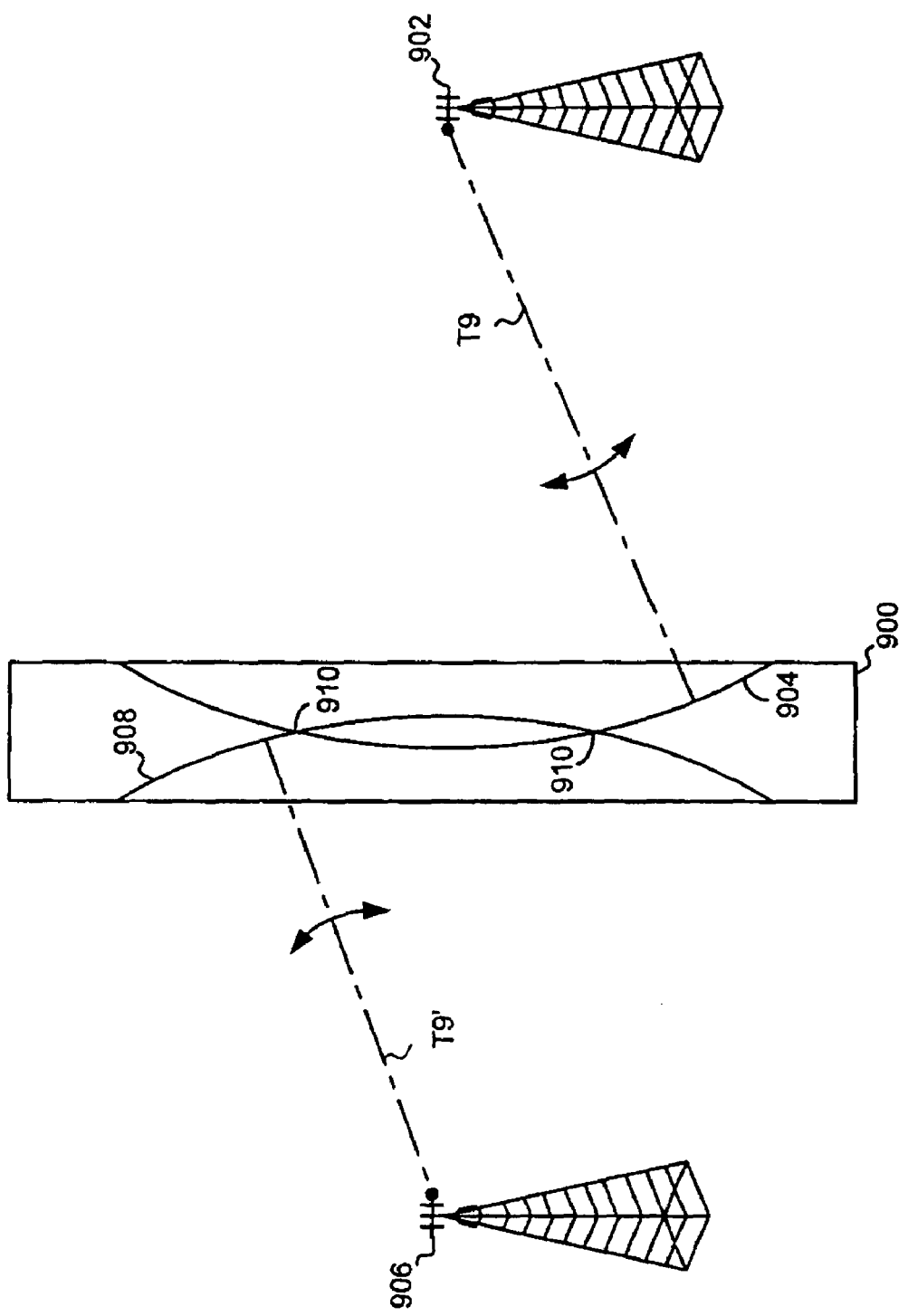
FIG. 9 is a schematic diagram illustrating a method for determining altitude using more than one wireless signal receiver, according to an embodiment of the present invention.

FIG. 9 illustrates this method for increasing accuracy. As shown, this example assumes that a reported x-y coordinate location has a resolution equal to the footprint of building 900. That is, a mobile wireless device determined to be at the x-y coordinates of building 900 could be located anywhere within the footprint of building 900. Measuring a transmission time T9 from a first wireless signal receiver 902 would therefore reveal that the mobile wireless device could be anywhere along arc 904 over the footprint of building 900. Measuring another transmission time T9' from a second wireless signal receiver 906 dramatically reduces the number of possible locations of the mobile wireless device, by showing that the mobile wireless device must be along another arc 908. The intersections 910 of arcs 904 and 908 represent the possible altitudes of the mobile wireless device. Introducing additional measured transmission times from other wireless signal receivers would further reduce the number of possible altitudes of mobile wireless device and further increase accuracy.

Although, for clarity, FIG. 9 illustrates the wireless transmissions in two dimensions, it should be understood that the described concepts can be extrapolated to three dimensional implementations, e.g., instead of arc 904, the possible locations of the mobile wireless device would be anywhere along the portion of the surface of a sphere that is over the footprint of building 900. The intersection of two spheres would be a circle or a portion of a circle along which the mobile wireless device could be located.

In an alternative embodiment of the present invention, instead of receiving only an x-y coordinate location, altitude processor 312 (see FIG. 3) receives a complete x-y-z coordinate location. Some global positioning systems provide this capability. Thus, it is unnecessary for altitude processor 312 to measure a transmission metric to determine the altitude of a wireless mobile device. However, in most instances, the z-coordinate (altitude) reported by the location system will not be easily comprehendible to users such as emergency dispatchers. Thus, in this alternative embodiment, although altitude processor 312 does not measure transmission metrics, altitude processor 312 still looks up the reported altitude in the altitude database 314 to find a corresponding ordinary description such as "second floor." Altitude database 314 associates x-y coordinates with altitudes and descriptions.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for determining wireless signal transmission metrics for use with a wireless device comprising:

identifying x-y coordinate locations that could have multiple altitudes;

collecting altitude data for an identified x-y coordinate location;

storing the altitude data for the identified x-y coordinate location in a database;

determining a plurality of wireless signal transmission metrics, wherein at least one wireless signal transmission metric is correlated to a specific altitude within the altitude data;

receiving a transmission signal from the wireless device;

measuring the received transmission signal applying at least one of the plurality of wireless signal transmission metrics to the measurements of the received transmission signal; and determining the altitude of the wireless device.

2. The method of claim 1, wherein the at least one wireless signal transmission metric correlated to the specific altitude is stored in the database.

3. The method of claim 1, wherein a wireless transmission metric is an angle of arrival for a transmission signal sent from the wireless device to a signal receiver.

4. The method of claim 1, wherein a wireless transmission metric is a time period needed for a transmission signal to travel from the wireless device to a signal receiver.

5. The method of claim 4, wherein time is measured using a Time-Division Multiple Access (TDMA) cellular system.

6. The method of claim 4, wherein time is measured using a TDMA based Global System for Mobile Communications (GSM).

7. The method of claim 1, wherein the database resides in a Mobile Switching Center (MSC).

8. A computer-readable medium which stores a set of instructions which when executed performs a method for determining wireless signal transmission metrics for use with a wireless device, the method executed by the set of instructions comprising:

identifying x-y coordinate locations that could have multiple altitudes;

collecting altitude data for an identified x-y coordinate location;

storing the altitude data for the identified x-y coordinate location in a database;

determining a plurality of wireless signal transmission metrics, wherein at least one wireless signal transmission metric is correlated to a specific altitude within the altitude data;

receiving a transmission signal from the wireless device; and measuring the received transmission signal.

9. The computer-readable medium of claim 8 further comprising:

applying at least one of the plurality of wireless signal transmission metrics to the measurements of the received transmission; and determining the altitude of the wireless device.

10. The computer-readable medium of claim 8, wherein the at least one wireless signal transmission metric correlated to the specific altitude is stored in the database.

11. The computer-readable medium of claim 8, wherein a wireless transmission metric is an angle of arrival for a transmission signal sent from the wireless device to a signal receiver.

12. The computer-readable medium of claim 8, wherein a wireless transmission metric is a time period needed for a transmission signal to travel from the wireless device to a signal receiver.

13. The computer-readable medium of claim 12 wherein time is measured using a Time-Division Multiple Access (TDMA) cellular system.

14. The computer-readable medium of claim 12, wherein time is measured using a TDMA based Global System for Mobile Communications (GSM).

15. A system for determining an altitude for a wireless device comprising:

a location system for:
identifying x-y coordinate locations that could have multiple altitudes;

an altitude processor for:
collecting altitude data for an identified x-y coordinate locatiom;

determining a plurality of wireless signal transmission metrics, wherein at least one wireless signal transmission metric is correlated to a specific altitude within the altitude data;

measuring a received transmission signal from the wireless device;

applying at least one of the plurality of wireless signal transmission metrics to measurements of the received transmission signal; and determining the altitude of the wireless device in accordance with the measuring and applying;

and a database for storing:
the altitude data for the identified x-y coordinate location; and the transmission metrics.

16. The system of claim 15, wherein the location system can determine the x-y location using at least one of a global positioning system, signal attenuation, angle of arrival, time of arrival, time difference of arrival, enhanced observed time of arrival, and time advance.

17. The system of claim 15, wherein the database can store location description data for a specific altitude for the x-y coordinate location.

18. The system of claim 15 further comprising a location requestor for receiving x-y coordinate location and altitude data.

19. The system of claim 15 further comprising an individual location system for use with the wireless device.

* * * * *